United States Patent
Hori et al.

(10) Patent No.: US 9,169,910 B2
(45) Date of Patent: Oct. 27, 2015

(54) GEAR DEVICE

(71) Applicant: AISIN SEIKI KABUSHIKI KAISHA, Kariya-shi (JP)

(72) Inventors: Kenji Hori, Toyota (JP); Shuhei Uchida, Kariya (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 240 days.

(21) Appl. No.: 13/899,772

(22) Filed: May 22, 2013

(65) Prior Publication Data
US 2013/0312552 A1    Nov. 28, 2013

(30) Foreign Application Priority Data

May 23, 2012    (JP) ................. 2012-117446

(51) Int. Cl.
*F16H 29/04*    (2006.01)
*F16H 23/10*    (2006.01)
(Continued)

(52) U.S. Cl.
CPC ............... *F16H 37/04* (2013.01); *F16H 1/321* (2013.01); *F16H 23/00* (2013.01); *F16H 23/10* (2013.01); *F16H 25/04* (2013.01); *Y10T 74/1836* (2015.01)

(58) Field of Classification Search
CPC ........... F16H 1/321; F16H 1/006; F16H 1/34; F16H 2001/324; F16H 2001/327; F16H 3/002; F16H 3/005; F16H 3/54; F16H 3/74; F16H 23/00; F16H 23/02; F16H 23/10; F16H 29/04; F16H 33/10; F16H 25/04; F16H 37/04; F16H 1/12; Y10T 74/1836
USPC ....... 74/425, 434, 438, 570.1, 571.11, 412 R, 74/423; 475/169–173
See application file for complete search history.

(56) References Cited

U.S. PATENT DOCUMENTS

| 422,356 A | 2/1890 | Smith |
| 1,748,907 A * | 2/1930 | Vallance ................. 475/163 |

(Continued)

FOREIGN PATENT DOCUMENTS

| DE | 202009010093 U1 * | 10/2009 | ............... F16H 1/32 |
| DE | 20 2009 010 093 U1 | 12/2009 | |

(Continued)

OTHER PUBLICATIONS

Extended European Search Report issued Aug. 9, 2013, in Patent Application No. 13168778.2.

(Continued)

*Primary Examiner* — William Kelleher
*Assistant Examiner* — Bobby Rushing, Jr.
(74) *Attorney, Agent, or Firm* — Oblon, McClelland, Maier & Neustadt, L.L.P.

(57) ABSTRACT

A gear device includes an eccentric cam rotatably formed and including a support portion arranged eccentrically relative to a rotational axis center of the eccentric cam, an internally toothed gear provided coaxially to the eccentric cam, an externally toothed gear supported by the support portion and engaged with the internally toothed gear, an output portion integrally coaxially rotating with the externally toothed gear, and a bearing portion supporting the output portion in a state where an axis line of the output portion and the externally toothed gear slants relative to the rotational axis center of the eccentric cam in a manner crossing the rotational axis center. Each of the internally toothed gear and the externally toothed gear includes a bevel gear portion which is formed by forming gear teeth on a circular cone whose apex overlaps with an intersection point of the axis line and the rotational axis center.

13 Claims, 4 Drawing Sheets

(51) Int. Cl.
  *F16H 37/16* (2006.01)
  *F16H 37/04* (2006.01)
  *F16H 25/04* (2006.01)
  *F16H 23/00* (2006.01)
  *F16H 1/32* (2006.01)

(56) References Cited

U.S. PATENT DOCUMENTS

| | | | | |
|---|---|---|---|---|
| 4,841,809 | A | * | 6/1989 | Jolly .............................. 475/163 |
| 5,484,345 | A | * | 1/1996 | Fukaya ........................... 475/162 |
| 5,954,610 | A | * | 9/1999 | Kamimura .................... 475/180 |
| 7,530,292 | B2 | * | 5/2009 | Ishikawa ......................... 74/640 |
| 7,770,820 | B2 | * | 8/2010 | Clearman et al. .......... 239/222.11 |
| 7,779,799 | B2 | * | 8/2010 | Schafer et al. ............. 123/90.17 |
| 2001/0013714 | A1 | * | 8/2001 | Ochiai et al. .................. 296/223 |

FOREIGN PATENT DOCUMENTS

| | | | |
|---|---|---|---|
| EP | 1270995 A1 * | 1/2003 | ............... F16H 1/32 |
| JP | 5-26304 | 2/1993 | |
| JP | 7-248047 | 9/1995 | |
| JP | 2012-177415 | 9/2012 | |

OTHER PUBLICATIONS

Partial English translation of Japanese Office Action issued Aug. 18, 2015 for JP 2012-117446, filed May 23, 2012.

* cited by examiner

GEAR DEVICE

CROSS REFERENCE TO RELATED APPLICATIONS

This application is based on and claims priority under 35 U.S.C. §119 to Japanese Patent Application 2012-117446, filed on May 23, 2012, the entire content of which is incorporated herein by reference.

TECHNICAL FIELD

This disclosure generally relates to a gear device.

BACKGROUND DISCUSSION

A known gear device includes an eccentric cam having a support portion which is eccentrically arranged relative to a rotational axis and rotatably actuated, an internally toothed gear provided coaxially with the eccentric cam, and an externally toothed gear supported by the eccentric cam and meshed with the internally toothed gear.

For example, JPH05-26304A (hereinafter referred to as Patent reference 1) discloses a construction in which an output shaft is connected to an externally toothed gear via an Oldham's coupling. By fixing the internally toothed gear, according to the construction disclosed in Patent reference 1, a rotation of the eccentric cam can be reduced on the basis of a difference of the number of teeth between the internally toothed gear and the externally toothed gear and outputted.

Notwithstanding, whereas a speed reducer which is downsized and having high speed reduction ratio can be provided by adopting the foregoing construction, there is a drawback that the construction is assumed to be complex by the application of the Oldham's coupling. Further, because the speed reducer attains the high speed reduction ratio, the large load is applied between the meshed gear teeth. Thus, in order to transmit a high torque, face widths (lengths along tooth trace) of the internally toothed gear and the externally toothed gear need to be extended to increase the meshing dimension between the meshed gear teeth. The axial dimension, or axial length is assumed to be long according to the foregoing construction, which leaves room for improvement.

A need thus exists for a gear device which is not susceptible to the drawback mentioned above.

SUMMARY

In light of the foregoing, the disclosure provides a gear device for reducing speed of an inputted driving rotation to be outputted, which includes an eccentric cam rotatably formed and including a support portion serving as an axis center arranged eccentrically relative to a rotational axis center of the eccentric cam, and an internally toothed gear provided at a position to be coaxial to the rotational axis center of the eccentric cam. The gear device further includes an externally toothed gear including smaller number of teeth than the internally toothed gear, supported by the support portion, and engaged with the internally toothed gear. The gear device further includes an output portion integrally coaxially rotating with the externally toothed gear, and a bearing portion supporting the output portion in a state where an axis line of the output portion and the externally toothed gear slants relative to the rotational axis center of the eccentric cam in a manner crossing the rotational axis center of the eccentric cam. Each of the internally toothed gear and the externally toothed gear includes a bevel gear portion which is formed by forming gear teeth on a circular cone whose apex overlaps with an intersection point of the axis line and the rotational axis center.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
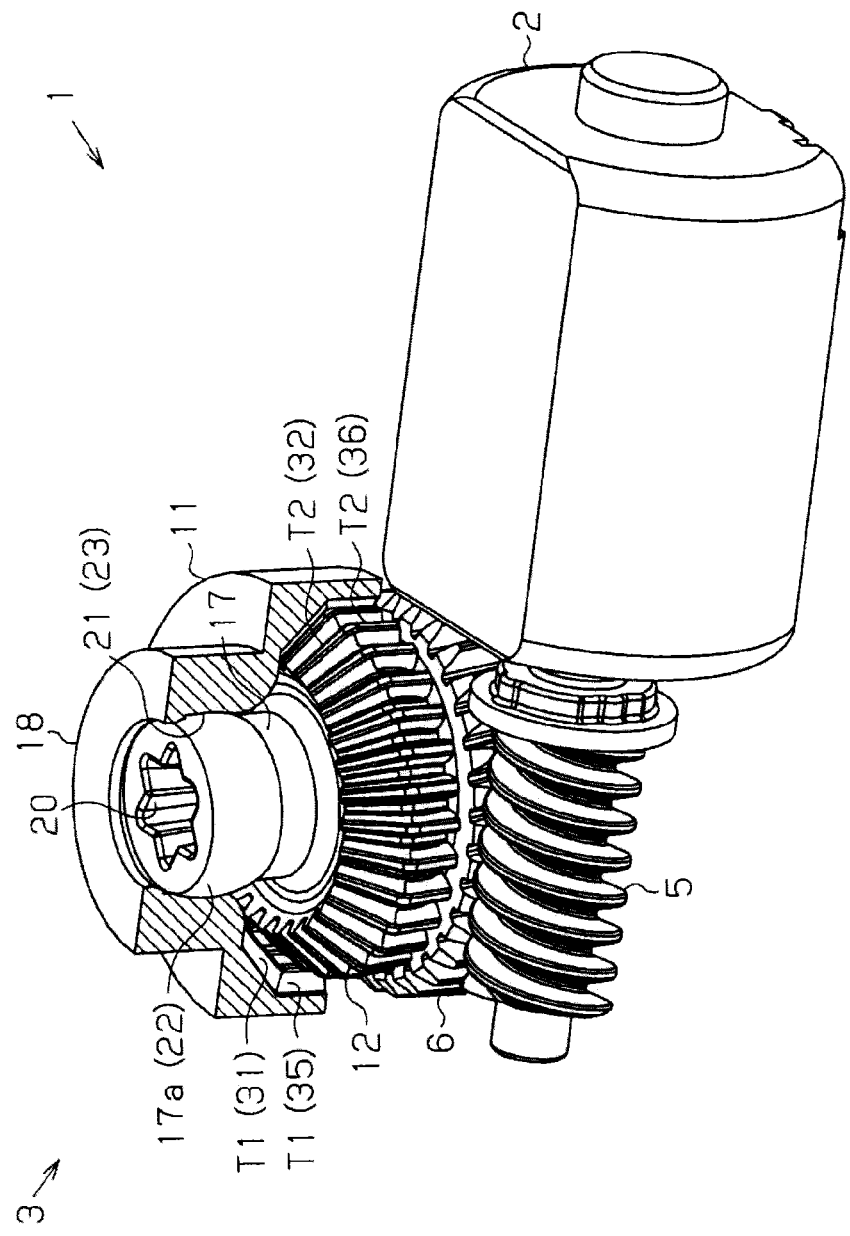
FIG. 1 is a perspective view of an actuator including a gear device according to an embodiment disclosed here.
Figure 2:
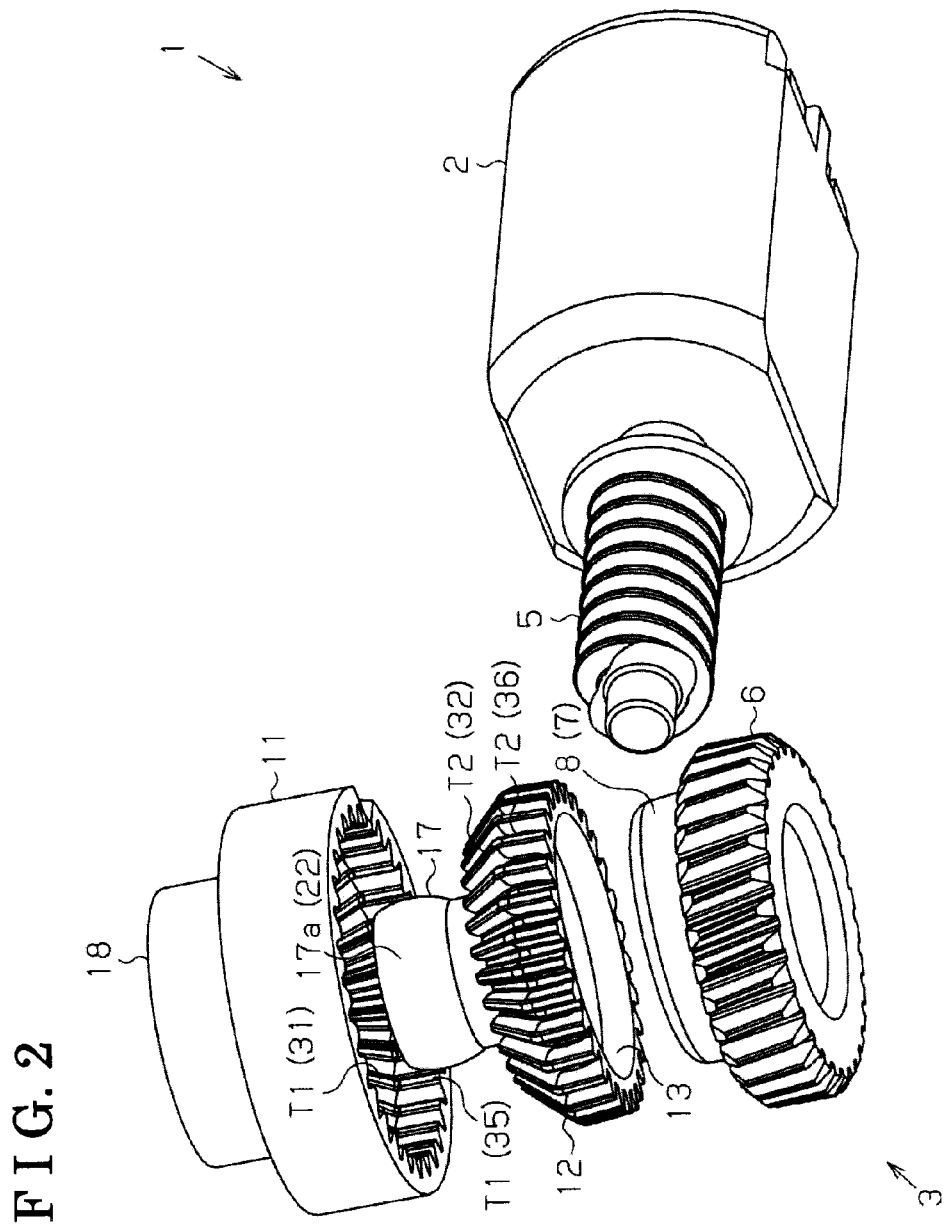
FIG. 2 is an exploded perspective view of the actuator including the gear device according to the embodiment disclosed here.
Figure 3:
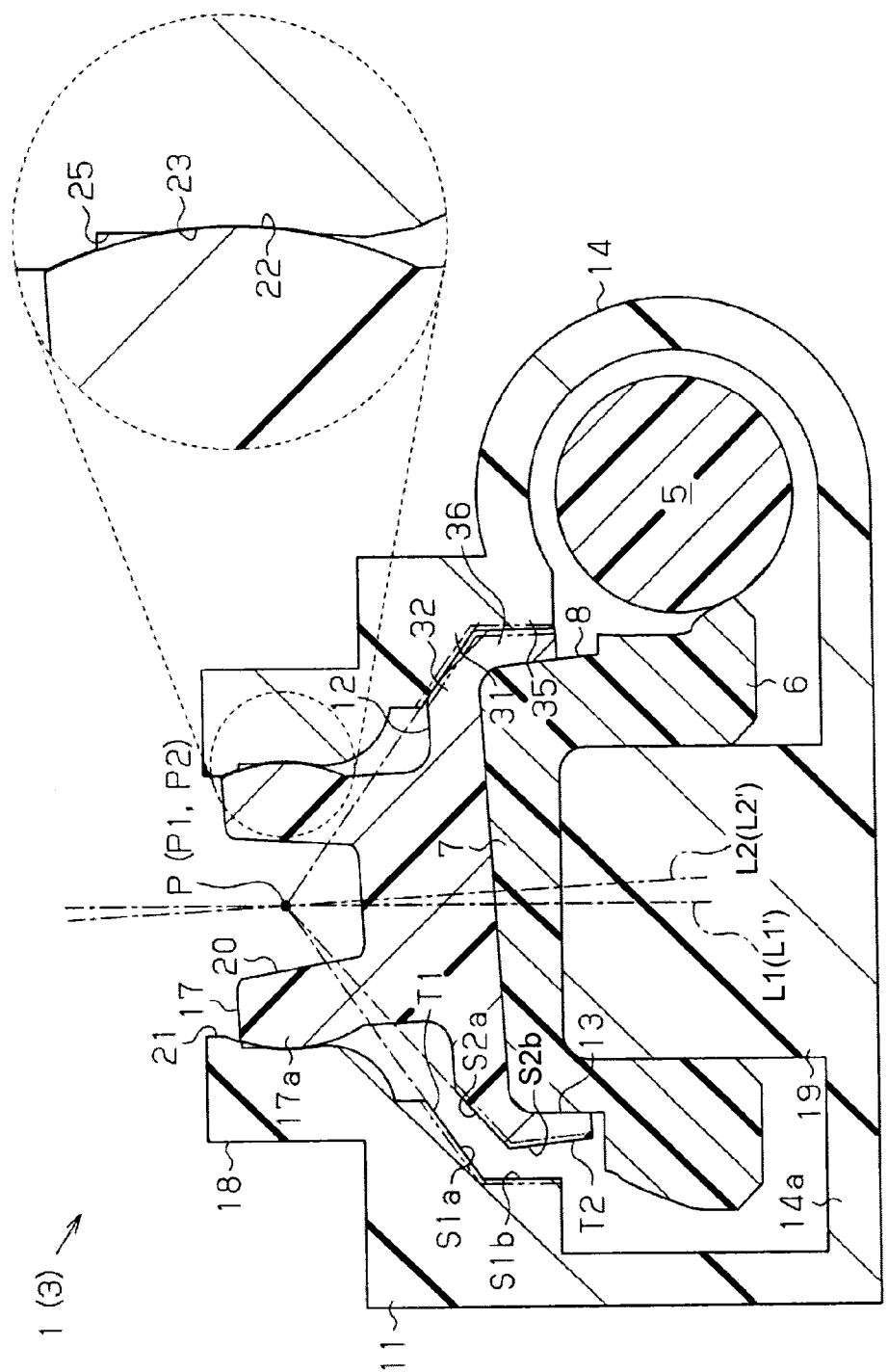
FIG. 3 is a cross-sectional view of the gear device according to the embodiment disclosed here.

One embodiment of a gear device will be explained with reference to illustrations of drawing figures as follows. As illustrated in FIGS. 1 to 3, an actuator device 1 according to the embodiment includes a motor 2 serving as a drive source and a gear device 3 for reducing motor rotation speed of the motor 2 and for outputting the motor rotation with reduced speed.

The gear device 3 according to the embodiment includes a worm gear 5 rotated by motor actuation and a wheel gear 6 meshed with the worm gear 5. Further, as illustrated in FIGS. 2 and 3, an eccentric cam 8 which includes a support portion 7 arranged eccentrically relative to a rotational axis L1 and coaxially and integrally rotates with the wheel gear 6 is provided at a first axial end (i.e., upper end portion in FIG. 3) of the wheel gear 6. According to the embodiment, the wheel gear 6 and the eccentric cam 8 which are made of resin are integrally formed. Similarly, the worm gear 5 is made of resin. The worm gear 5 of the embodiment is configured to transmit a reverse input rotation, that is, the worm gear 5 is formed with a helix angle, or spiral angle (pressure angle) which allows the worm gear 5 to be actuated to rotate by the wheel gear 6 without performing self-locking.

Further, as shown in FIG. 3, an internally toothed gear 11 is coaxially positioned on a rotational axis L1 (top side in FIG. 3) of the wheel gear 6 and the eccentric cam 8. Plural gear teeth T1 are formed on an inner circumferential surface of the internally toothed gear 11. An externally toothed gear 12 including plural gear teeth T2 provided at an outer circumferential surface thereof and engaging with the internally toothed gear 11 is supported by the support portion 7 of the eccentric cam 8.

Particularly, the support portion 7 of the eccentric cam 8 is formed in a substantially pillar, or cylindrical shape (shaft shape). A fitting portion 13 which opens in a substantially pillar, or cylindrical shape is formed at an axial end portion (bottom end portion in FIG. 3) of the externally toothed gear 12. The externally toothed gear 12 is rotatably supported in a state where the fitting portion 13 fits onto the support portion 7 of the eccentric cam 8.

The number of teeth of the externally toothed gear 12 is set to be smaller than the number of teeth of the internally toothed gear 11. Further, the internally toothed gear 11 is integrally formed with a case 14 which structures the outside, or a shell of the actuator device 1. Further, an output portion 17 formed in a shaft shape is provided at an axial end portion of the externally toothed gear 12 opposite to the fitting portion 13 (i.e., upper end portion in FIG. 3) to be coaxial to the externally toothed gear 12. A bearing portion 18 supporting the output portion 17 at a coaxial position relative to the internally toothed gear 11 and the eccentric cam 8 is provided at an axial end of the internally toothed gear 11 (i.e., upper end portion side in FIG. 3).

That is, according to the gear device 3 of the embodiment, the internally toothed gear 11 serves as a fixed element. Thus, the externally toothed gear 12 meshed with the internally toothed gear 11 revolves around, or relative to the internally toothed gear 11 while rotating on its axis inside the internally toothed gear 11 in response to the rotation of the eccentric cam 8 supporting the externally toothed gear 12.

Further, the output portion 17 integrally provided with the externally toothed gear 12 is supported by the bearing portion 18 in a state where an axis line L2 of the output portion 17 slants to intersect the rotational axis L1 of the eccentric cam 8. That is, the output portion 17 rotates in a precession manner in which a tip end 17a of the output portion 17 turns about the rotational axis L1 of the eccentric cam 8 by the rotation and the revolution of the externally toothed gear 12 about its axis and relative to the internally toothed gear 11 in response to the rotation of the eccentric cam 8. The gear device 3 is configured to reduce the speed of the driving rotation inputted to the eccentric cam 8 on the basis of a difference of the number of teeth between the internally toothed gear 11 and the externally toothed gear 12, and to output the rotation (rotation on its axis) of the externally toothed gear 12 with reduced speed from the output portion 17.

The case 14 of the embodiment is formed in a box shape which accommodates the motor 2 and the gear device 3 (including a control board of the motor 2 and the gear teeth T1 of the internally toothed gear 11). Further, the wheel gear 6 and the eccentric cam 8 are rotatably supported by a support shaft 19 formed at a bottom portion 14a of the case 14. Further, the externally toothed gear 12 and the output portion 17 which are made of resin are integrally formed. A connection hole 20 having a polygonal shape (e.g., dodecagonal shape) in cross section and opens in an axial direction is formed at a tip end surface of the output portion 17 (an end surface of the tip end 17a).

More particularly, the bearing portion 18 of the embodiment includes an insertion hole 21 which is positioned coaxially with the eccentric cam 8 and the internally toothed gear 11 and to which the tip end 17a of the output portion 17 is inserted to be positioned. The bearing portion 18 is integrally formed with the case 14 similarly to the internally toothed gear 11. The bearing portion 18 rotatably supports the output portion 17 in a state where the tip end 17a of the output portion 17 slidably contacts an inner periphery, or inner circumference of the insertion hole 21.

Particularly, according to the construction of the embodiment, the support portion 7 of the eccentric cam 8 slants so that an axis line L2' of the support portion 7 intersects the rotational axis L1 of the eccentric cam 8. By the fitting engagement of the fitting portion 13 to the support portion 7, the externally toothed gear 12 and the output portion 17 are rotatable in a state where the axis line L2 of the output portion 17 substantially accords to the axis line L2' of the support portion 7.

On the other hand, a slidably contacting convex surface 22 which curves in a substantially spherical configuration having an intersection point P of the axis line L2 with the rotational axis L1 of the eccentric cam 8 as the center is formed at an outer circumference of the tip end 17a of the output portion 17. Further, a slidably contacting concave surface 23 which curves in a substantially spherical configuration to match to the slidably contacting convex surface 22 provided at the output portion 17 is formed at an inner circumference of the insertion hole 21 of the bearing portion 18. The output portion 17 is supported by the bearing portion 18 in a state where the slidably contacting convex surface 22 slidably contacts the slidably contacting concave surface 23.

Further, according to the construction of the embodiment, a retention recessed portion 25 configured to store lubrication agent, for example, grease inside thereof is formed at the slidably contacting concave surface 23 provided at the output portion 17. The retention recessed portion 25 is formed by recessing the slidably contacting concave surface 23 to form an annular groove over the entire circumference of the slidably contacting concave surface 23. According to the embodiment, accordingly, the bearing portion 18 smoothly supports the rotation of the output portion 17 and a sealing performance at the bearing portion 18 is enhanced.

A meshing construction of the internally toothed gear 11 and the externally toothed gear 12 of the gear device 3 will be explained hereinafter.

As shown in FIG. 3, the internally toothed gear 11 includes a tapered inner circumferential surface (circular cone S1a) whose imaginary apex P1 (i.e., serving as an apex) overlaps with the intersection point P of the axis line L2 of the output portion 17 and the externally toothed gear 12 and the rotational axis L1 of the eccentric cam 8 which accords to an axis line L1' of the internally toothed gear 11. Further, the internally toothed gear 11 includes an inner circumferential surface with a cylindrical surface (cylindrical surface S1b) at a position apart from the intersection point P compared to the circular cone S1a to be coaxial to the circular cone S1a. Each of gear teeth T1 of the internally toothed gear 11 is formed over the entire circumference of the circular cone S1a and over the entire circumference of the cylindrical surface S1b.

Similarly, the externally toothed gear 12 includes a tapered outer circumferential surface (circular cone S2a) (i.e., serving as an apex) whose imaginary apex P2 (i.e., serving as an apex) overlaps with the intersection point P of the rotational axis L1 of the eccentric cam 8 and the axis line L2 of the externally toothed gear 12. Further, the externally toothed gear 12 includes an outer circumferential surface with a cylindrical surface (cylindrical surface S2b) at a position apart from the intersection point P compared to the circular cone S2a to be coaxial to the circular cone S2a. Each of gear teeth T2 of the externally toothed gear 12 is formed over the entire circumference of the circular cone S2a and the entire circumference of the cylindrical surface S2b.

That is, according to the gear device 3 of the embodiment, the internally toothed gear 11 and the externally toothed gear 12 include a bevel gear portion 31 and a bevel gear portion 32 which are formed by forming the gear teeth T1 and the gear teeth T2 on the circular cone S1a and the circular cone S2a, respectively. Further, the internally toothed gear 11 and the externally toothed gear 12 include a spur gear portion 35 and a spur gear portion 36 which are formed by forming the gear teeth T1 and the gear teeth T2 on the cylindrical surface S1b and the cylindrical surface S2b, respectively. According to the construction of the embodiment, the internally toothed gear 11 and the externally toothed gear 12 are meshed by the engagement of the bevel gear portion 31 and the bevel gear portion 32 and the engagement of the spur gear portion 35 and the spur gear portion 36.

Operations of the meshing construction will be explained hereinafter. According to the construction of the embodiment, the internally toothed gear 11 and the externally toothed gear 12 include the bevel gear portion 31 and the bevel gear portion 32, respectively, whose respective apexes P1 and P2 overlap with the intersection point P of the rotational axis L1 of the eccentric cam 8 and the axis line L2 of the output portion 17 and the externally toothed gear 12. By the engagement of the bevel gear portion 31 of the internally toothed gear 11 and the bevel gear portion 32 of the externally toothed gear 12, favorable meshing state is ensured even when the externally toothed gear 12 slants, or leans relative to the internally toothed gear 11. Further, the meshing dimension, or engaging area of the gear teeth T1 and the gear teeth T2 can be enlarged by expanding the face width of the gear teeth T1 and the gear teeth T2 while restraining an increase of an axial dimension along the rotational axis L1. The gear device 3 of the embodiment can transmit greater level of torque while ensuring higher speed reduction ratio with a downsized simple construction.

According to the construction of the embodiment, the following effects and advantages can be attained.

The gear device 3 includes the eccentric cam 8 having the support portion 7 eccentrically arranged relative to the rotational axis L1 and actuated to rotate, the internally toothed gear 11 positioned coaxially to the eccentric cam 8, and the externally toothed gear 12 supported by the support portion 7 of the eccentric cam 8 and meshed with the internally toothed gear 11. The gear device 3 includes the output portion 17 integrally and coaxially rotating with the externally toothed gear 12, and the bearing portion 18 supporting the output portion 17 which is in a slanting state where the axis line L2 of the output portion 17 and the externally toothed gear 12 intersects the rotational axis L1 of the eccentric cam 8. The internally toothed gear 11 and the externally toothed gear 12 include the bevel gear portions 31, 32, respectively, formed by forming the gear teeth T1, T2 on the circular cones S1a, S2a whose imaginary apexes P1, P2 overlap the intersection point P of the rotational axis L1 and the axis line L2.

That is, by the rotational actuation of the eccentric cam 8, the externally toothed gear 12 supported by the eccentric cam 8 revolves relative to the internally toothed gear 11 while rotating on its axis inside the internally toothed gear 11. The output portion 17 integrally and coaxially rotates with the externally toothed gear 12 in a precession manner in which the tip end 17a of the output portion 17 turns about the rotational axis L1 of the eccentric cam 8. Thus, according to the foregoing construction, the speed of the driving rotation inputted to the eccentric cam 8 can be reduced on the basis of the difference of the number of teeth between the internally toothed gear 11 and the externally toothed gear 12, and the rotation (rotation on its axis) with the reduced speed of the externally toothed gear 12 can be directly outputted from the output portion 17 without intervening a complex coupling.

Further, the internally toothed gear 11 and the externally toothed gear 12 are engaged in a state where the bevel gear portion 31 and the bevel gear portion 32 whose imaginary apexes P1, P2 overlap with the intersection point P of the rotational axis L1 relative to the axis line L2 are meshed with each other. Thus, even in a case where the externally toothed gear 12 leans, or slants relative to the internally toothed gear 11, favorable meshed state can be ensured. Further, because the tooth traces of the gear teeth T1, T2 constructing the bevel gear portions 31, 32, respectively, are arranged to extend in a direction to cross obliquely relative to the rotational axis L1 of the eccentric cam 8, the meshing dimension, or engaging area between the gear teeth T1, and the gear teeth T2 can be increased by expanding the face width of the gear teeth T1, T2 while restraining an increase of the axial dimension along the rotational axis L1. Consequently, higher speed reduction ratio can be ensured with downsized and simple construction, and higher level of the torque can be transmitted.

The internally toothed gear 11 and the externally toothed gear 12 include the spur gear portion 35 and the spur gear portion 36 which are arranged coaxially to the bevel gear portion 31, and the bevel gear portion 32, respectively. According to the foregoing construction, the face width of the gear teeth T1, T2 can be further increased to ensure greater meshing dimension, or engaging area. In other words, greater meshing dimension, or engaging area can be ensured by further expanding face with of the gear teeth T1, T2. In consequence, further greater torque can be transmitted. Then, even in a case where the externally toothed gear 12 relatively moves in a direction away from the internally toothed gear 11 along the rotational axis L1 of the eccentric cam 8, the engagement of the externally toothed gear 12 and the internally toothed gear 11 can be maintained by the engagement of the spur gear portion 35 and the spur gear portion 36.

The bearing portion 18 includes the insertion hole 21 which is positioned coaxially to the eccentric cam 8 and the internally toothed gear 11 and to which the output portion 17 is inserted to be positioned. In those circumference, the bearing portion 18 rotatably supports the output portion 17 in a state where the outer circumferential portion of the output portion 17 slidably contacts the inner circumferential portion of the insertion hole 21.

According to the foregoing construction, the output portion 17 can be securely supported at the position close to the intersection point P of the rotational axis L1 of the eccentric cam 8 with the axis line L2 of the output portion 17 and the externally toothed gear 12. Accordingly, axial runout of the output portion 17, that is, a fluctuation of the slant, or lean of the externally toothed gear 12 and the output portion 17 relative to the axis line L1' of the internally toothed gear 11 which accords to the rotational axis L1 of the eccentric cam 8 can be restrained. In consequence, the meshing state of the internally toothed gear 11 and the externally toothed gear 12 can be further favorably maintained.

The slidably contacting convex surface 22 which curves to have a substantially spherical configuration is formed on an outer circumference of the output portion 17. The slidably contacting concave surface 23 which curves in a substantially spherical configuration matching with the slidably contacting convex surface 22 of the output portion 17 is formed at the inner circumference of the insertion hole 21 of the bearing portion 18.

According to the foregoing construction, the output portion 17 is supported by the bearing portion 18 in a state where the slidably contacting convex surface 22 and the slidably contacting concave surface 23 of the insertion hole 21 slidably contact each other. Accordingly, the smooth rotation of the output portion 17 and the precession motion of the output portion 17 can be attained. Further, because a clearance, or gap formed between the output portion 17 and the insertion hole 21 can be reduced, the water proof performance, or water impermeability at the bearing portion 18 can be enhanced. Further, according to the foregoing construction, positioning when assembling the output portion 17 and the bearing portion 18 becomes easy.

The retention recessed portion 25 which allows to store the lubrication agent, for example, grease inside thereof is formed at the slidably contacting concave surface 23 of the insertion hole 21. Thus, the bearing portion 18 can be stably lubricated. In consequence, the further smooth rotation of the output portion 17 and the precession motion of the output portion 17 can be attained.

The retention recessed portion 25 is formed by recessing the annular groove over the entire circumference of the slidably contacting concave surface 23. According to the foregoing construction, further favorable lubrication state can be ensured. Further, because the lubrication agent serves as a sealing agent, higher water proof performance, or water impermeability can be attained.

The bearing portion 18 supports the tip end 17a of the output portion 17. The connection hole 20 having a polygonal shape (e.g., dodecagonal shape) in cross section and opens in an axial direction is formed at the end surface of the tip end 17a. Accordingly, the rotation of the output portion 17 can be transmitted via a portion where a turning radius of the output portion 17 which performs a precession motion is assumed to be the minimum.

The support portion 7 of the eccentric cam 8 slants, or leans so that the axis line L2' of the support portion 7 crosses relative to the rotational axis L1 of the eccentric cam 8. In those circumstances, the externally toothed gear 12 is rotatably supported by fitting the fitting portion 13 opening in a substantially cylindrical shape onto the support portion 7. Accordingly, the externally toothed gear 12 and the output portion 17 can be stably rotated in a state where the axis line L2 of the externally toothed gear 12 slants, or leans relative to the rotational axis L1 of the eccentric cam 8.

The eccentric cam 8 is actuated to rotate via a rotation transmitting mechanism formed with the worm gear 5 and the wheel gear 6 integrally formed with the eccentric cam 8. Then, the worm gear 5 is configured to transmit the reverse input rotation from the wheel gear 6.

That is, by applying the worm gear 5 and the wheel gear 6 as the rotation transmitting mechanism, higher speed reduction ratio can be attained with a simple construction. Generally, according to a construction in which a transmission of the reverse input rotation is restricted by the self-locking of the worm gear, a stress pushing each other is applied between the externally toothed gear and the internally toothed gear and between the externally toothed gear and the eccentric cam when large load input with the level which restrains the rotation of the output portion is applied. Then, according to the construction in which the axial line of the externally toothed gear leans, or slants relative to the axis line of the internally toothed gear, there is a possibility that the rotation of the externally toothed gear is restrained, that is, the externally toothed gear is assumed to be a jammed state by a frictional force caused by the slanting construction of the externally toothed gear.

However, according to the construction of the embodiment explained above, by the reversal rotation of the worm gear 5, which occurs, for example, after stopping the driving input, a jamming stress applied between the externally toothed gear 12 and the internally toothed gear 11, and between the externally toothed gear 12 and the eccentric cam 8 can be released. Accordingly, the generation of the jamming of the externally toothed gear 12 is prevented to avoid the gear device 3 from being in the locked state.

The embodiment may be modified as follows.

The overlapping state of the imaginary apexes P1, P2 of the circular cones S1a, S2a (bevel gear portions 31, 32) of the internally toothed gear 11 and the externally toothed gear 12 relative to the intersection point P of the rotational axis L1 of the eccentric cam 8 and the axis line L2 of the output portion 17 and the externally toothed gear 12 is not limited to be strictly accord to each other. Namely, a tolerance within a range in which the engagement of the internally toothed gear 11 and the externally toothed gear 12 is established is acceptable.

According to the construction of the embodiment, the internally toothed gear 11 and the externally toothed gear 12 include the spur gear portion 35 and the spur gear portion 36 provided coaxially to the bevel gear portion 31 and the bevel gear portion 32, respectively. However, alternatively, the internally toothed gear 11 and the externally toothed gear 12 may not include the spur gear portion 35 and the spur gear portion 36.

According to the construction of the embodiment, the bearing portion 18 includes the insertion hole 21 which is positioned coaxially to the eccentric cam 8 and the internally toothed gear 11 and to which the output portion 17 is inserted to be positioned. Further, the slidably contacting convex surface 22 which curves in a substantially spherical configuration is formed at an outer circumference of the output portion 17 and the slidably contacting concave surface 23 which curves in a substantially spherical configuration matching the slidably contacting convex surface 22 of the output portion 17 is formed at the insertion hole 21 of the bearing portion 18. Further, the according to the construction of the embodiment, the output portion 17 is supported by the bearing portion 18 in a state where the slidably contacting convex surface 22 is slidably in contact with the slidably contacting concave surface 23. However, the construction of the bearing portion 18 is not limited and may be changed including a configuration of the output portion 17.

Figure 4A:
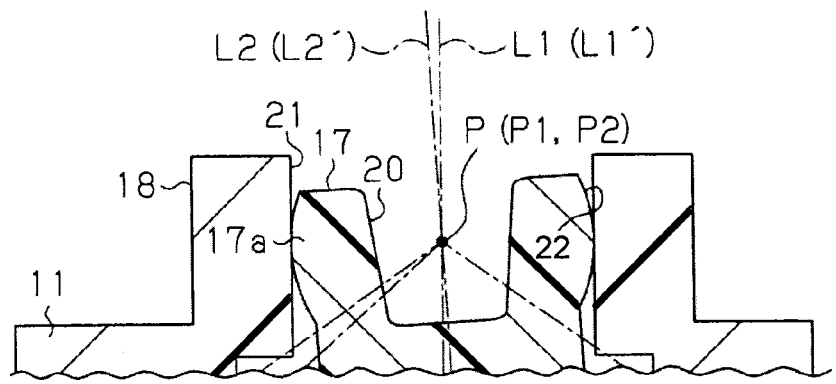
FIG. 4A is a cross-sectional view of a first modified example of a bearing portion according to the embodiment disclosed here.

For example, alternatively, as shown in FIG. 4A, whereas the slidably contacting convex surface 22 is formed on the outer circumference of the output portion 17, a curved slidably contacting surface such as the slidably contacting concave surface 23 may not be formed at the insertion hole 21 of the bearing portion 18.

Figure 4B:
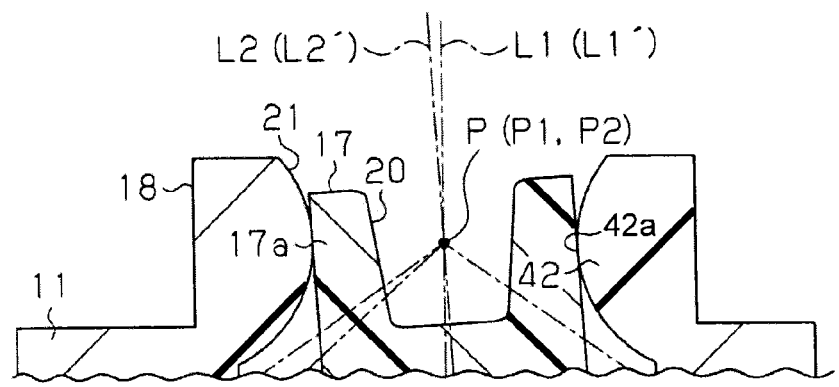
FIG. 4B is a cross-sectional view of a second modified example of a bearing portion according to the embodiment disclosed here.

Further, alternatively, as shown in FIG. 4B, whereas an annular protruding portion 42 serving as a protruding portion having a slidably contacting surface 42a which curves to protrude towards the output portion 17 (inward in a radial direction) is formed at the inner circumference of the insertion hole 21, a curved slidably contacting surface may not be formed at the outer circumference of the output portion 17. Further, alternatively, the slidably contacting convex surface 22 serving as a protrusion portion of the output portion 17 may be formed at the outer circumference of the output portion 17, and the annular protruding portion 42 may be formed at the inner circumference of the insertion hole 21.

Figure 4C:
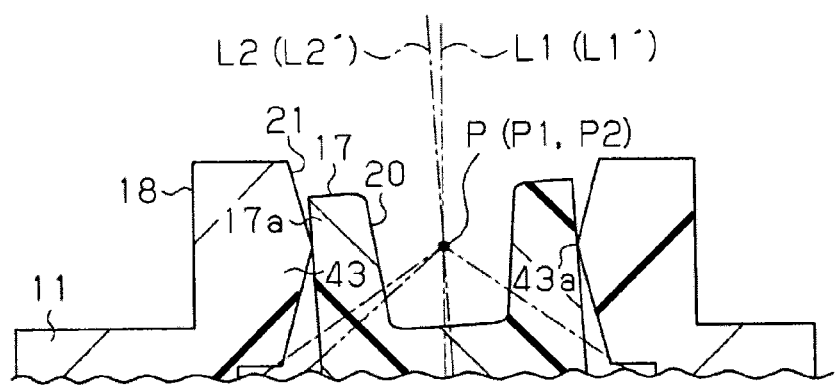
FIG. 4C is a cross-sectional view of a third modified example of a bearing portion according to the embodiment disclosed here.

Further, alternatively, as shown in FIG. 4C, in place of the annular protruding portion 42 including the slidably contacting surface 42a, an annular protruding portion (i.e., serving as a protruding portion) 43 which is formed in a triangular configuration in cross section and protrudes towards the output portion 17 (inward in a radial direction) may be formed on the inner circumference of the insertion hole 21. In those circumstances, an apex portion 43a of the triangular configuration in cross section may be positioned at the coaxial position whose height position is substantially equal to the intersection point P (i.e. the position equal to the intersection point P in an upward-downward direction along the rotational axis L1 of the eccentric cam 8 in FIG. 4C). Thus, by slidably contacting the apex portion 43a to the outer circumference of the output portion 17, favorable supporting state can be ensured without forming a large gap between the annular protruding portion and the output portion 17.

Further, alternatively, a construction in which any concave portion and convex portion, or protruding portion is not formed on the outer circumference of the output portion 17 and the inner circumference of the insertion hole 21 may be adopted. Further, according to the construction of the embodiment, the bearing portion 18 supports the tip end 17a of the output portion 17 which slidably contacts the inner circumference of the insertion hole 21. However, the construction is not limited, and, alternatively, the output portion 17 may be inserted to be positioned in the insertion hole 21 in a manner that the tip end 17a protrudes outside the case 14. In those circumstances, an intermediate portion of the output portion 17 which slidably contacts the inner circumference of the insertion hole 21 may be supported by the bearing portion 18.

According to the embodiment, the retention recessed portion 25 which is for storing the lubrication agent, for example, the grease therein is formed at the slidably contacting concave surface 23 of the insertion hole 21. However, the construction is not limited, and a similar retention recessed portion may be formed on the slidably contacting convex surface 22 of the output portion 17. Alternatively, similar retention recessed portion may be formed on both of the slidably contacting concave surface 23 and the slidably contacting convex surface 22. Further, configurations and the number of the retention recessed portion may be changed. Still further, alternatively, a construction which does not include the retention recessed portion may be adopted.

According to the embodiment, the support portion 7 of the eccentric cam 8 slants, or leans in a manner that the axis line L2' of the support portion 7 crosses relative to the rotational axis L1 of the eccentric cam 8. The externally toothed gear 12 is rotatably supported by fitting the fitting portion 13, which cylindrically opens to the support portion 7, onto the support portion 7. However, the construction is not limited to the foregoing, and as long as the externally toothed gear 12 and the output portion 17 can be stably rotated in a state where the axis line L2 of the support portion 7 slants, or leans relative to the rotational axis L1 of the eccentric cam 8, a supporting manner of the externally toothed gear 12 by the support portion 7 may be changed. For example, a support portion of an eccentric cam may be formed in a ball shape. In those circumstances, the externally toothed gear 12 may be supported rotatably and pivotably by the fitting portion 13 fitting to the ball-shaped support portion. Similar effects and advantages to the embodiment can be attained according to the foregoing construction.

According to the embodiment, the eccentric cam 8 is rotatably actuated via the rotation transmitting mechanism formed with the wheel gear 6 and the worm gear 5. However, the construction is not limited to the foregoing, and a construction of the rotation transmitting mechanism may be changed. For example, gears other than the worm gear 5 and the wheel gear 6 may be combined. Further, alternatively, in place of the worm gear 5 and the wheel gear 6, a speed reducer other than the worm and wheel mechanism, for example, using a face gear and a pinion gear may be adopted. Still further, alternatively, a construction which does not include any rotation transmitting mechanism, that is, a construction in which the eccentric cam 8 is directly connected to a motor shaft may be adopted.

According to the embodiment, the wheel gear 6 and the eccentric cam 8 are integrally formed with resin, and the externally toothed gear 12 and the output portion 17 are integrally formed with resin. However, alternatively, each of the wheel gear 6 and the eccentric cam 8, and each of the externally toothed gear 12 and the output portion 17 may be separately formed to be integrally assembled. The separately formed internally toothed gear 11 and the bearing portion 18 may be arranged at the coaxial position according to an alternative construction.

According to the embodiment, the internally toothed gear 11 and the externally toothed gear 12 include the bevel gear portion 31 and the bevel gear portion 32 formed by forming the gear teeth T1 and the gear teeth T2 on the circular cone S1a and the circular cone S2a, respectively, whose imaginary apexes P1, P2 overlap with the intersection point P of the rotational axis L1 relative to the axis line L2. However, the construction is not limited to the foregoing, and alternatively, a construction which does not include the bevel gear portions 31, 32, that is, a construction in which both of the gear teeth T1 of the internally toothed gear 11 and the gear teeth T2 of the externally toothed gear 12 are formed with spur gears may be adopted. The jamming of the externally toothed gear 12 may likely to be generated according to the foregoing construction, however, the jamming of the externally toothed gear 12 may be prevented by applying the worm gear 5 which is configured to transmit the reverse input rotation from the wheel gear 6.

A gear device, which includes an eccentric cam including a support portion arranged eccentrically relative to a rotational shaft, an internally toothed gear positioned coaxially to the eccentric cam, an externally toothed gear supported by the support portion and engaging with the internally toothed gear, an output portion integrally coaxially rotating with the externally toothed gear, a bearing portion supporting the output portion in a state where an axis line of the output portion and the externally toothed gear slants relative to a rotational axis of the eccentric cam in a manner crossing the rotational axis of the eccentric cam, and a rotation transmitting mechanism including a worm gear and a wheel gear and actuating the eccentric cam to rotate. The worm gear is configured to transmit a reverse input rotation from the wheel gear. The gear device defines the internally toothed gear as a fixed element and is configured to reduce speed of driving rotation which is inputted to the eccentric cam on the basis of a difference of the number of teeth between the internally toothed gear and the externally toothed gear and to output the driving rotation with reduced speed.

The retention recessed portion is provided by recessing an annular groove over an entire circumference of a circumferential surface. According to the foregoing construction, more favorable lubrication state can be ensured. Further, because the lubrication agent serves as a sealing agent, higher water proof performance, or water impermeability can be attained.

According to the construction of the embodiment, the gear device (3) for reducing speed of an inputted driving rotation to be outputted includes the eccentric cam (8) rotatably formed and including the support portion (7) serving as an axis center arranged eccentrically relative to the rotational axis center (L1) of the eccentric cam (8), and an internally toothed gear (11) provided at a position to be coaxial to the rotational axis center of the eccentric cam. The gear device (3) further includes the externally toothed gear (12) including smaller number of teeth than the internally toothed gear (11), supported by the support portion (7), and engaged with the internally toothed gear (11). The gear device (3) further includes an output portion (17) integrally coaxially rotating with the externally toothed gear (12), and a bearing portion (18) supporting the output portion (17) in a state where an axis line (L2) of the output portion (17) and the externally toothed gear (12) slants relative to the rotational axis center of the eccentric cam (8) in a manner crossing the rotational axis center (L1) of the eccentric cam (8). Each of the internally toothed gear (11) and the externally toothed gear (12) includes a bevel gear portion (31, 32) which is formed by forming gear teeth (T1, T2) on a circular cone (S1a, S2a) whose apex overlaps with an intersection point (P) of the axis line (L2) and the rotational axis center (L1).

That is, by the rotational actuation of eccentric cam 8, the externally toothed gear 12 supported by eccentric cam 8 revolves relative to the internally toothed gear 11 while rotating on its axis inside the internally toothed gear 11. Then, output portion 17 integrally coaxially rotates with the externally toothed gear 12 in a state where the output portion 17 turns around a rotational axis of the eccentric cam 8, that is, in a state where the eccentric cam 8 turns in a precession manner. Thus, according to the foregoing construction, the speed of the driving rotation inputted to the eccentric cam 8 can be reduced on the basis of the difference of the number of teeth between the internally toothed gear 11 and the externally toothed gear 12, and the rotation (the rotation on its axis) of the externally toothed gear 12 with reduced speed can be directly outputted from the output portion 17 integrally rotated with the externally toothed gear 12 without intervening a complex coupling mechanism.

Further, the internally toothed gear 11 and the externally toothed gear 12 are meshed in a state where the bevel gear portions 31, 32 whose apexes overlap with the intersection point P of the axis line L2 of the externally toothed gear 12 and the output portion 17 and the rotational axis L1 of the eccentric cam 8. Accordingly, a favorable engagement state can be ensured even in a state where the externally toothed gear 12 slants, or leans relative to the internally toothed gear 11. Further, because the tooth trace of each of gear teeth forming the bevel gear portions 31, 32 extends in a direction crossing the rotational axis L1 of the eccentric cam 8, the face width of each of the gear teeth is expanded to enlarge the meshing dimension between the gear teeth T1, T2 while restraining the axial direction along the rotational axis L1 of the eccentric cam 8. In consequence, high reduction speed ratio can be ensured and higher torque can be transmitted with downsized and simple construction.

According to the construction of the embodiment, each of the internally toothed gear (11) and the externally toothed gear (12) includes a spur gear portion (35, 36) arranged coaxially with the bevel gear portion (31, 32), and the spur gear portions (35, 36) of the internally toothed gear (11) and the externally toothed gear (12) are engaged with each other.

According to the foregoing construction, the face width of each of the gear teeth is further expanded to ensure greater meshing dimension. In consequence, higher torque can be transmitted. Then, even when the externally toothed gear 12 relatively moves in a direction being away from the internally toothed gear 11 along the rotational axis of the eccentric cam 8, engagement between the externally toothed gear 12 and the internally toothed gear 11 can be maintained by the engagement between the spur gear portions 35, 36.

According to the construction of the embodiment, the bearing portion (18) includes an insertion hole (21) which is arranged coaxially with the eccentric cam (8) and the internally toothed gear (11) and to which the output portion (17) is inserted to be positioned; and the bearing portion (18) supports the output portion (17) in a state where an outer circumference of the output portion (17) slidably contacts an inner circumference of the insertion hole (21).

According to the foregoing construction, the output portion 17 can be securely supported at the position close to the intersection point P of the axis line L2 of the externally toothed gear 12 and the output portion 17 and the rotational axis L1 of the eccentric cam 8. Thus, an axial runout of the output portion 17, that is, the fluctuation of the slant, or lean of the externally toothed gear 12 and the output portion 17 relative to the axial line L1' of the internally toothed gear 11 which accords to the rotational axis L1 of the eccentric cam 8 can be restrained. In consequence, the meshing state of the internally toothed gear 11 and the externally toothed gear 12 can be further favorably maintained.

According to the construction of the embodiment, the output portion (17) is formed with a slidably contacting convex surface (22) which curves in a spherical shape on an outer circumference thereof; and the insertion hole (21) is formed with a slidably contacting concave surface (23) which curves in a spherical shape corresponding to the slidably contacting surface (22) on an inner circumference thereof.

According to the foregoing construction, the output portion 17 is supported by the bearing portion 18 in a state where the slidably contacting convex surface 22 and the slidably contacting concave surface 23 slidably contact each other. Thus, according to the foregoing construction, smoother rotation of the output portion 17 and the procession motion of the output portion 17 can be attained. Further, because a gap formed between the output portion 17 and the insertion hole 21 is reduced, the water impermeability, or the water proof performance can be enhanced. According to the foregoing construction, further, the positioning when assembling the output portion 17 to the bearing portion 18 is assumed to be easy.

According to the construction of the embodiment, the gear device 3 further includes the retention recessed portion (25) formed at least one of the slidably contacting convex surface (22) and the slidably contacting concave surface (23), the retention recessed portion (25) for storing lubrication agent.

According to the foregoing construction, the bearing portion 18 can be stably lubricated. In consequence, smoother rotation of the output portion 17 and the procession motion of the output portion 17 can be attained.

According to the construction of the embodiment, the retention recessed portion (25) corresponds to an annular groove recessed over an entire circumference of at least one of the slidably contacting convex surface (22) and the slidably contacting concave surface (23).

According to the foregoing construction, the bearing portion 18 can be stably lubricated. In consequence, smoother rotation of the output portion 17 and the procession motion of the output portion 17 can be attained.

According to the construction of the embodiment, the gear device 3 further includes the protruding portion (42) formed at least one of the output portion (17) and the insertion hole (21), the protruding portion (42) includes a slidably contacting surface which curves to protrude to the other of the output portion (17) and the insertion hole (21).

According to the foregoing construction, smoother rotation of the output portion 17 and the procession motion of the output portion 17 can be attained.

According to the construction of the embodiment, the gear device 3 further includes the protruding portion (42, 43) formed at least one of the output portion (17) and the insertion hole (21), the protruding portion (42, 43) includes a slidably contacting portion (42a, 43a) which protrudes to the other of the output portion (17) and the insertion hole (21).

According to the foregoing construction, smoother rotation of the output portion 17 and the procession motion of the output portion 17 can be attained.

According to the construction of the embodiment, the gear device 3 further includes the rotation transmitting mechanism including a worm gear (5) and a wheel gear (6), the rotation transmitting mechanism actuating the eccentric cam (8) to rotate. The worm gear (5) is configured to transmit a reverse input rotation from the wheel gear (6).

That is, by the application of the worm gear 5 and the wheel gear 6 to the rotation transmitting mechanism, higher speed reduction ratio can be attained with a simple construction. Generally, according to a construction in which the transmission of the reverse input rotation is restricted by the self-locking of the worm gear, when a load input whose level is large enough to restrain the rotation of the output portion is applied, stress to push each other is generated between the externally toothed gear and the internally toothed gear and between the externally toothed gear and the eccentric cam. According to the construction in which the axis line of the externally toothed gear leans, or slants relative to the axis line of the internally toothed gear, a jammed state in which the rotation of the externally toothed gear is restrained by the frictional force generated by the slant, or lean of the externally toothed gear may be caused.

However, according to the foregoing construction of the disclosure, the jamming stress generated between the externally toothed gear 12 and the internally toothed gear 11 and between the externally toothed gear 12 and the eccentric cam 8 by the reverse rotation of the worm gear 5 (e.g., after stopping of the driving input) can be released. Thus, the generation of the jamming of the externally toothed gear 12 can be prevented to avoid the gear device 3 from being the locking state.

According to the construction of the disclosure, the gear device which is for transmitting a higher torque while ensuring high reduction speed ratio with a downsized and simple construction can be attained.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A gear device for reducing speed of an inputted driving rotation to be outputted, comprising:
    an eccentric cam rotatably formed and including a support portion with an axis center arranged eccentrically relative to a rotational axis center of the eccentric cam;
    an internally toothed gear provided at a position to be coaxial to the rotational axis center of the eccentric cam;
    an externally toothed gear supported by the support portion and engaged with the internally toothed gear, the externally toothed gear-including smaller number of teeth than the internally toothed gear;
    an output portion integral with the externally toothed gear, the output portion rotating coaxially with the externally toothed gear; and
    a bearing portion supporting the output portion in a state where an axis line of the output portion and the externally toothed gear slants relative to the rotational axis center of the eccentric cam in a manner crossing the rotational axis center of the eccentric cam; wherein
    each of the internally toothed gear and the externally toothed gear includes a bevel gear portion which is formed by forming gear teeth on a circular cone whose apex overlaps with an intersection point of the axis line and the rotational axis center,
    each of the internally toothed gear and the externally toothed gear includes a spur gear portion arranged coaxially with the bevel gear portion, and the spur gear portions of the internally toothed gear and the externally toothed gear are engaged with each other,
    the bearing portion includes an insertion hole which is arranged coaxially with the eccentric cam and the internally toothed gear and to which the output portion is inserted to be positioned; and the bearing portion supports the output portion in a state where an outer circumference of the output portion slidably contacts an inner circumference of the insertion hole, and
    the output portion is formed with a slidably contacting convex surface which curves in a spherical shape on an outer circumference thereof; and the insertion hole is formed with a slidably contacting concave surface which curves in a spherical shape corresponding to the slidably contacting surface on an inner circumference thereof.

2. A gear device for reducing speed of an inputted driving rotation to be outputted, comprising:
    an eccentric cam rotatably formed and including a support portion with an axis center arranged eccentrically relative to a rotational axis center of the eccentric cam;
    an internally toothed gear provided at a position to be coaxial to the rotational axis center of the eccentric cam;
    an externally toothed gear supported by the support portion and engaged with the internally toothed gear, the externally toothed gear-including smaller number of teeth than the internally toothed gear;
    an output portion integral with the externally toothed gear, the output portion rotating coaxially with the externally toothed gear; and
    a bearing portion supporting the output portion in a state where an axis line of the output portion and the externally toothed gear slants relative to the rotational axis center of the eccentric cam in a manner crossing the rotational axis center of the eccentric cam; wherein
    each of the internally toothed gear and the externally toothed gear includes a bevel gear portion which is formed by forming gear teeth on a circular cone whose apex overlaps with an intersection point of the axis line and the rotational axis center,
    the bearing portion includes an insertion hole which is arranged coaxially with the eccentric cam and the internally toothed gear and to which the output portion is inserted to be positioned; and the bearing portion supports the output portion in a state where an outer circumference of the output portion slidably contacts an inner circumference of the insertion hole, and
    the output portion is formed with a slidably contacting convex surface which curves in a spherical shape on an outer circumference thereof; and the insertion hole is formed with a slidably contacting concave surface which curves in a spherical shape corresponding to the slidably contacting surface on an inner circumference thereof.

3. The gear device according to claim 2, further comprising:
a retention recessed portion formed on at least one of the slidably contacting convex surface and the slidably contacting concave surface, the retention recessed portion for storing lubrication agent.

4. The gear device according to claim 1, further comprising:
a retention recessed portion formed on at least one of the slidably contacting convex surface and the slidably contacting concave surface, the retention recessed portion for storing lubrication agent.

5. The gear device according to claim 3, wherein the retention recessed portion corresponds to an annular groove recessed over an entire circumference of at least one of the slidably contacting convex surface and the slidably contacting concave surface.

6. The gear device according to claim 4, wherein the retention recessed portion corresponds to an annular groove recessed over an entire circumference of at least one of the slidably contacting convex surface and the slidably contacting concave surface.

7. The gear device according to claim 2, further comprising:
a protruding portion formed on at least one of the output portion and the insertion hole, the protruding portion includes a slidably contacting surface which curves to protrude to the other of the output portion and the insertion hole.

8. The gear device according to claim 1, further comprising:
a protruding portion formed on at least one of the output portion and the insertion hole, the protruding portion includes a slidably contacting portion which protrudes to the other of the output portion and the insertion hole.

9. The gear device according to claim 1, further comprising:
a rotation transmitting mechanism including a worm gear and a wheel gear, the rotation transmitting mechanism actuating the eccentric cam to rotate; wherein
the worm gear is configured to transmit a reverse input rotation from the wheel gear.

10. The gear device according to claim 2, further comprising:
a rotation transmitting mechanism including a worm gear and a wheel gear, the rotation transmitting mechanism actuating the eccentric cam to rotate; wherein
the worm gear is configured to transmit a reverse input rotation from the wheel gear.

11. The gear device according to claim 3, further comprising:
a rotation transmitting mechanism including a worm gear and a wheel gear, the rotation transmitting mechanism actuating the eccentric cam to rotate; wherein
the worm gear is configured to transmit a reverse input rotation from the wheel gear.

12. The gear device according to claim 5, further comprising:
a rotation transmitting mechanism including a worm gear and a wheel gear, the rotation transmitting mechanism actuating the eccentric cam to rotate; wherein
the worm gear is configured to transmit a reverse input rotation from the wheel gear.

13. The gear device according to claim 7, further comprising:
a rotation transmitting mechanism including a worm gear and a wheel gear, the rotation transmitting mechanism actuating the eccentric cam to rotate; wherein
the worm gear is configured to transmit a reverse input rotation from the wheel gear.

* * * * *